(12) United States Patent
Furuhashi

(10) Patent No.: US 6,378,058 B1
(45) Date of Patent: Apr. 23, 2002

(54) METHOD OF AND APPARATUS FOR PROCESSING INFORMATION, AND PROVIDING MEDIUM

(75) Inventor: Makoto Furuhashi, Tokyo (JP)

(73) Assignee: Sony Computer Entertainment Inc., Tokyo (JP)

(*) Notice: Subject to any disclaimer, the term of this patent is extended or adjusted under 35 U.S.C. 154(b) by 0 days.

(21) Appl. No.: 09/339,220

(22) Filed: Jun. 24, 1999

(30) Foreign Application Priority Data

Jun. 24, 1998 (JP) .......................................... 10-176825

(51) Int. Cl.[7] .............................................. G06F 12/00
(52) U.S. Cl. ...................................... 711/203; 711/212
(58) Field of Search ................................ 711/202, 212, 711/220, 171, 206, 203, 6, 209, 217

(56) References Cited

U.S. PATENT DOCUMENTS

| | | | | |
|---|---|---|---|---|
| 4,079,451 A | * | 3/1978 | Woods | ........................ 364/200 |
| 4,473,878 A | * | 9/1984 | Zolnowski et al. | |
| 4,604,695 A | * | 8/1986 | Widen et al. | |
| 4,819,152 A | * | 4/1989 | Deerfield et al. | |
| 4,873,521 A | * | 10/1989 | Dietrich et al. | |
| 5,155,823 A | * | 10/1992 | Tsue | |
| 5,410,671 A | * | 4/1995 | Elgamal et al. | |
| 5,960,465 A | * | 9/1999 | Adams | ........................ 711/208 |

OTHER PUBLICATIONS

U.S. Patent Application Serial No. 09/339,815 by Makoto Furuhashi, filed on Jun. 25, 1999, status pending.
U.S. Patent Application Serial No. 09/346,673 by Makoto Furuhashi, filed on Jul. 2, 1999, status pending.

* cited by examiner

Primary Examiner—Matthew Kim
Assistant Examiner—Christian P. Chace
(74) Attorney, Agent, or Firm—Paul A. Guss

(57) ABSTRACT

Logical addresses start from different base addresses for respective numbers of bits of data making up words. One physical address in a main memory corresponds to a plurality of logical addresses, and an address converter has an association table of physical and logical addresses. The address converter decides which base address an entered logical address belongs to for thereby determining the number of bits of data of one word, and determines a physical address so as to be able to read words corresponding to the number of bits from the main memory. Words made up of different numbers of bits can quickly be converted from logical addresses into physical addresses.

21 Claims, 6 Drawing Sheets

FIG. 4

| LOGICAL ADDRESS | PHYSICAL ADDRESS | | |
|---|---|---|---|
| | 8bit/word | 16bit/word | 32bit/word |
| 0 0 0 0 h | 0 0 0 0 h | | |
| 0 0 0 1 h | 0 0 0 1 h | | |
| 0 0 0 2 h | 0 0 0 2 h | | |
| ⋮ | ⋮ | | |
| 0 F F D h | 0 F F D h | | |
| 0 F F E h | 0 F F E h | | |
| 0 F F F h | 0 F F F h | | |
| 1 0 0 0 h | | 0 0 0 0 h | |
| 1 0 0 1 h | | 0 0 0 2 h | |
| 1 0 0 2 h | | 0 0 0 4 h | |
| ⋮ | | ⋮ | |
| 1 7 F D h | | 0 F F A h | |
| 1 7 F E h | | 0 F F C h | |
| 1 7 F F h | | 0 F F E h | |
| 2 0 0 0 h | | | 0 0 0 0 h |
| 2 0 0 1 h | | | 0 0 0 4 h |
| 2 0 0 2 h | | | 0 0 0 8 h |
| ⋮ | | | ⋮ |
| 2 3 F D h | | | 0 F F 4 h |
| 2 3 F E h | | | 0 F F 8 h |
| 2 3 F F h | | | 0 F F C h |

METHOD OF AND APPARATUS FOR PROCESSING INFORMATION, AND PROVIDING MEDIUM

BACKGROUND OF THE INVENTION

1. Field of the Invention

The present invention relates to a method of and an apparatus for processing information, and a providing medium, and more particularly to a method of and an apparatus for processing information to be able to associate one logical address with numbers of bits making up one word on a physical address for reading and writing words made up of different numbers of bits according to common address management, and a providing medium for providing a program and/or data to carry out such a method.

2. Description of the Related Art

Information processing apparatus, e.g., personal computers, require a large-scale main memory for storing a program if the program is large in size. However, there is a limitation on the storage capacity of such a main memory, and a main memory having a storage capacity large enough to store a large program may not necessarily be available.

One solution to the above problems is to use a virtual memory that produces an apparent storage space larger than the storage space of a main memory. The user can use the virtual memory as if the apparent storage space were actually present for data storage.

Addresses used by the virtual memory are referred to as virtual addresses or logical addresses. Addresses used by the main memory are referred to as real addresses or physical addresses.

FIG. 6 of the accompanying drawings shows a conventional information processing apparatus. A process of converting a logical address into a physical address when a controller 70 reads data stored in a main memory 74 will be described below with reference to FIG. 6. The number of bits of each word of data handled by the controller 70 is fixed to "16", for example. Even with the fixed number of bits assigned to each word, it is possible that 16 bits are treated as one word, 8 bits as half word, and 32 bits as double word. Each word of data handled by the main memory 74 is also fixed to a certain number of bits, though the main memory 74 is also capable of treating different numbers of bits.

When the controller 70 reads data stored in the main memory 74, the controller 70 outputs a logical address to a bit decision unit 71, which determines the type of data that the entered logical address belongs to, i.e., how many bits make up one word of data that the entered logical address belongs to. The bit decision unit 71 then outputs the result of the decision and the logical address to a mode converter 72. Depending on the result of the decision, the mode converter 72 selects a mode (program) for converting a logical address into a physical address. If the bit decision unit 71 determines that one word is made up of 32 bits, then the mode converter 72 selects a 32-bit mode. If the bit decision unit 71 determines that one word is made up of 16 bits, then the mode converter 72 selects a 16-bit mode.

After the mode converter 72 has selected a mode for converting a logical address into a physical address, an address indicator 73 calculates a physical address using the selected mode and the logical address, and supplies the calculated physical address to the main memory 74. The main memory 74 reads data at the supplied physical address and supplies the data to the controller 70.

In this manner, the logical address is converted into the physical address after the mode corresponding to the number of bits of one word of data that the logical address belongs to has been selected.

If words made up of different numbers of bits are used, then the conventional information processing apparatus needs to change modes for reading data from physical addresses based on logical addresses, and cannot quickly generate physical addresses from logical addresses.

SUMMARY OF THE INVENTION

It is therefore an object of the present invention to determine physical addresses based on base addresses of logical addresses for quickly generating physical addresses for words of different sizes.

The above and other objects, features, and advantages of the present invention will become more apparent from the following description when taken in conjunction with the accompanying drawings in which a preferred embodiment of the present invention is shown by way of example.

BRIEF DESCRIPTION OF THE DRAWINGS

FIG. 4 is a table held by an address converter;

DETAILED DESCRIPTION OF THE PREFERRED EMBODIMENT

Various means of the present invention referred to in claims are implemented by corresponding steps in parentheses given in the next paragraph. However, the various means should not be interpreted as being limited to these steps only.

An information processing apparatus according to the present invention comprises input means (e.g., step S1 in FIG. 5) for entering a logical address, decision means (e.g., steps S2, S4, S6 in FIG. 5) for deciding a base address of the logical address entered by the input means, and determining means (e.g., step S9 in FIG. 5) for determining a physical address corresponding to the logical address based on the base address decided by the decision means.

Figure 1:
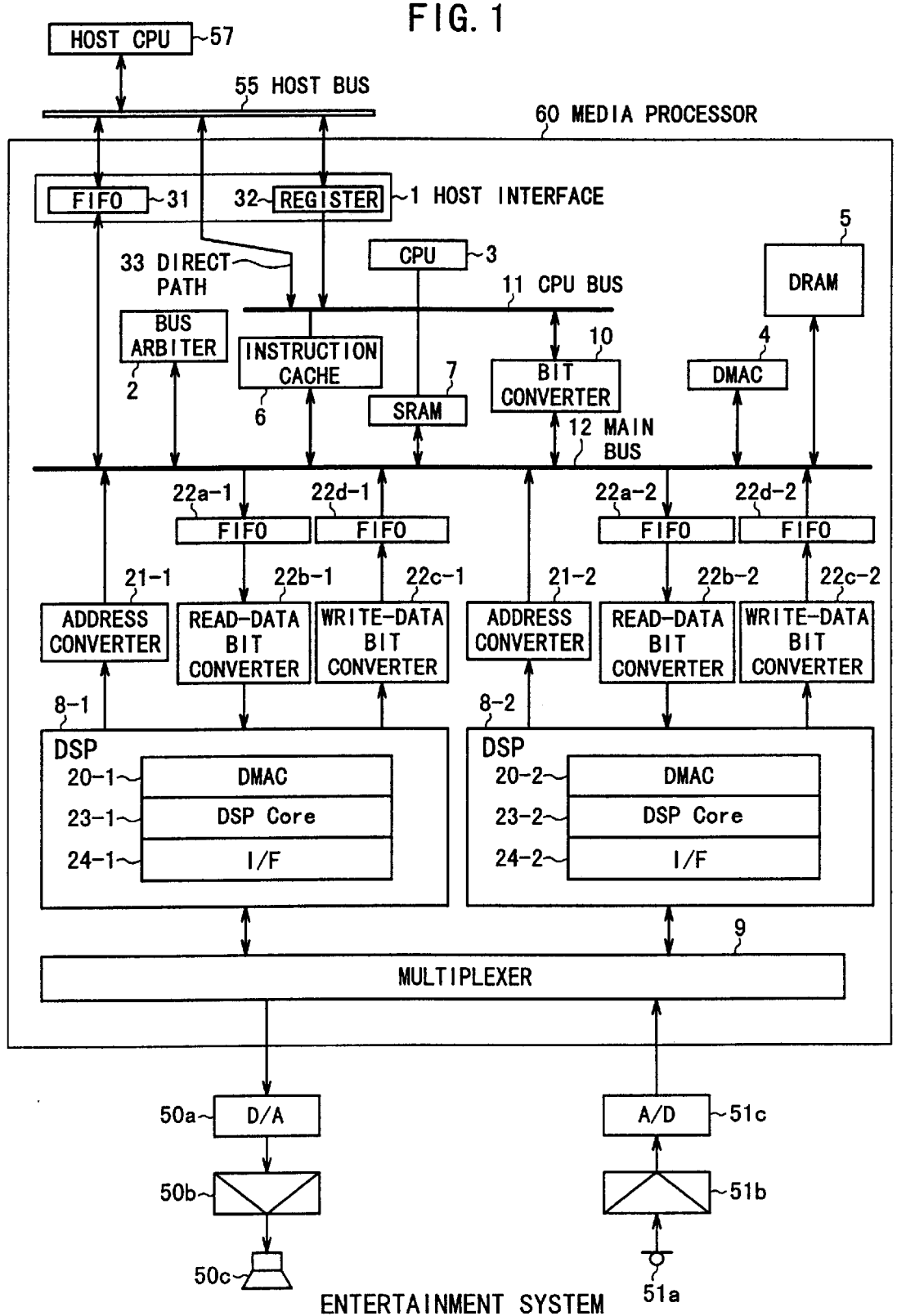
FIG. 1 is a block diagram of an entertainment system which incorporates an information processing apparatus according to the present invention.

FIG. 1 shows in block form an entertainment system which incorporates the information processing apparatus according to the present invention. In the entertainment system, a media processor 60 is connected to a host CPU (Central Processing Unit) 57 by a host bus 55. The media processor 60 comprises a processor that can be constructed as one chip. The media processor 60 has a host interface 1 comprising an FIFO (First-In, First-Out) memory 31, a register 32, and a direct path 33, which are connected to the host bus 55.

The media processor 60 has a CPU bus 11 to which there are connected the register 32, the direct path 33, a CPU 3, an instruction cache 6, an SRAM (Static Random-Access Memory) 7, and a bit converter 10. The media processor 60 also has a main bus 12 to which there are connected the FIFO memory 31, a bus arbiter 2, the instruction cache 6, the SRAM 7, the bit converter 10, a DMAC (Direct Memory Access Controller) 4, a DRAM (Dynamic Random-Access Memory) 5, and DSPs (Digital Signal Processors) 8-1, 8-2.

The host CPU 57 performs various processing operations according to a program stored in a memory (not shown). For example, the host CPU 57 reads programs and data from a recording medium such as a CD-ROM (Compact Disk—Read-Only Memory), not shown, and stores the read programs and data into the DRAM 5, and fetches stored programs and data from the DRAM 5. At this time, the host CPU 57 requests the DMAC 4 to perform DMA transfer of data between the FIFO memory 31 and the DRAM 5. The host CPU 57 is also capable of directly accessing the DRAM 5 and other units via the direct path 33.

The bus arbiter 2 serves to coordinate use of the main bus 12. For example, when the host CPU 57 sends a request for data transfer to the DMAC 4, the bus arbiter 2 grants the DMAC 4 exclusive use of the main bus 12 so that DMA data transfer can be performed from the host CPU 57 to the DRAM 5.

The FIFO memory 31 temporarily stores data outputted from the host CPU 57 and outputs the stored data via the main bus 12 to the DRAM 5, and also temporarily stores data transferred from the DRAM 5 and outputs the stored data to the host CPU 57. The register 32 is a register used when handshaking takes place between the host CPU 57 and the CPU 3, and stores commands and data representing processing statuses.

The CPU 3 accesses the instruction cache 6, loads a program stored therein, executes the program, and, if necessary, accesses the SRAM 7 and is supplied with certain data therefrom. If necessary data is not stored in the SRAM 7, then the CPU 3 requests the DMAC 4 to perform DMA data transfer from the DRAM 5 to the SRAM 7. If a necessary program is not stored in the instruction cache 6, the CPU 3 reads the program from the DRAM 5 into the instruction cache 6.

The SRAM 7 can be accessed at arbitrary addresses from both the CPU 3 and the DMAC 4 at the same time for reading and writing data. The SRAM 7 comprises a dual-port SRAM and used as a data cache, for example. The SRAM 7 serves to store those of the data stored in the DRAM 5 which are accessed highly frequently from the CPU 3. The SRAM 7 may be of a 2-bank memory arrangement, with one bank connected to the CPU bus 11 and the other bank to the main bus 12.

The instruction cache 6 is a memory cache whose arbitrary addresses can be accessed for reading a program therefrom. The instruction cache 6 serves to store those of the programs stored in the DRAM 5 which are accessed highly frequently from the CPU 3.

The bit converter 10 changes a bit width (e.g., 32 bits) of data entered via the CPU bus 11 to a bit width (e.g., 128 bits) matching the main bus 12 and outputs the data with the changed bit width, and also changes a bit width of data entered via the main bus 12 to a bit width matching the CPU bus 11 and outputs the data with the changed bit width.

DSP 8-1 comprises a DSP Core 23-1 for executing a DSP program, a DMAC 20-1 for effecting DMA transfer of data required when the DSP Core 23-1 executes the program between the DSP Core 23-1 and the DRAM 5, and an I/F (interface) 24-1 for transferring data between the DSP Core 23-1 and a circuit external to the media processor 60.

For data transfer between the DSP Core 23-1 and the DRAM 5, the DSP 8-1 requests the bus arbiter 2 for use of the main bus 12. After the DSP 8-1 acquires the right to use the main bus 12, DMA transfer of data is carried out by the DMAC 20-1. When the DSP 8-1 addresses the DRAM 5, a logic address generated by the DMAC 20-1 is converted by an address converter 21-1 into a physical address for the DRAM 5.

Data is read from the DRAM 5 into the DSP 8-1 via an FIFO memory 22a-1 and a read-data bit converter 22b-1. The read-data bit converter 22b-1 serves to convert bit width (e.g., 128 bits) of data entered from the DRAM 5 via the main bus 12 into a bit width (e.g., 24 bits) matching the DSP 8-1.

Data is written from the DSP 8-1 into the DRAM 5 via a write-data bit converter 22c-1 and an FIFO memory 22d-1. The write-data bit converter 22c-1 serves to convert a bit width matching the DSP 8-1 into a bit width of data outputted from the main bus 12 to the DRAM 5.

The FIFO memory 22a-1 allows data to be read from the DRAM 5 and to be written into the DSP 8-1 efficiently even in asynchronous operation. Similarly, the FIFO memory 22d-1 allows data to be read from the DSP 8-1 and to be written into the DRAM 5 efficiently even in asynchronous operation.

The I/F 24-1 is used to transfer audio data, for example, between the DSP 8-1 and a circuit external to the media processor 60. Audio data generated by the DSP Core 23-1 is outputted via the I/F 24-1 from a multiplexer 9, and supplied via a D/A converter 50a and an output amplifier 50b to a speaker 50c. An audio signal entered from a microphone 51a may be supplied via an input amplifier 51b and an A/D converter 51c to the multiplexer 9, and entered via the I/F 24-1 to the DSP Core 23-1. Which one of these processes is to be carried out is determined by the program executed by the DSP Core 23-1.

Although not described in detail, the media processor 60 also has a DSP 8-2, an address converter 21-2, an FIFO memory 22a-2, a read-data bit converter 22b-2, a write-data bit converter 22c-2, and an FIFO memory 22d-2, which are functionally and structurally identical to the DSP 8-1, the address converter 21-1, the FIFO memory 22a-1, the read-data bit converter 22b-1, the write-data bit converter 22c-c, and the FIFO memory 22d-1. The multiplexer 9 selects one of the DSP 8-1 and the DSP 8-2, and connects the selected DSP to the D/A converter 50a or the A/D converter 51c. The D/A converter 50a and the A/D converter 51c can be connected to different DSPs (e.g., the D/A converter 50a can be connected to the DSP 8-1 and the A/D converter 51c to the DSP 8-2) or the same DSP.

Figure 2:
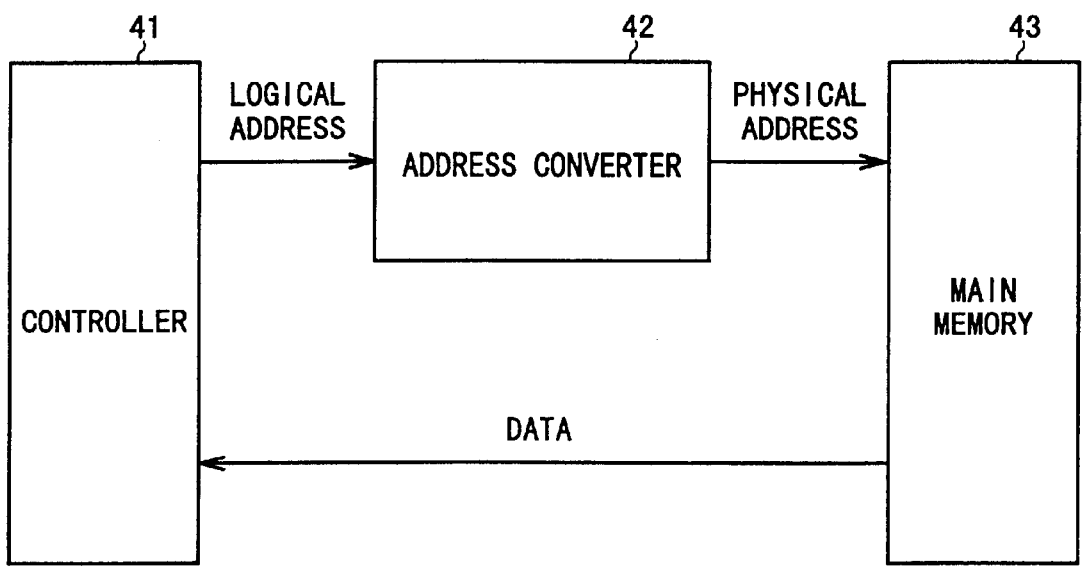
FIG. 2 is a block diagram of the information processing apparatus.

FIG. 2 is a block diagram illustrative of an address conversion between a controller 41 and a main memory 43. The controller 41 corresponds to either one of the CPU 3, the DSP Core 23-1, and the DSP Core 23-2, and the main memory 43 to the DRAM 5 and the SRAM 7. An address converter 42 corresponds to the instruction cache 6, the SRAM 7, and the address converters 21-1, 21-2, or a dedicated hardware unit (not shown).

For reading data from the main memory 43, the controller 41 outputs a logical address of a virtual memory to the address converter 42. The address converter 42 converts the logical address into a physical address, and outputs the physical address to the main memory 43. The main memory 43 reads data at the physical address and outputs the data to the controller 41.

Figure 3:
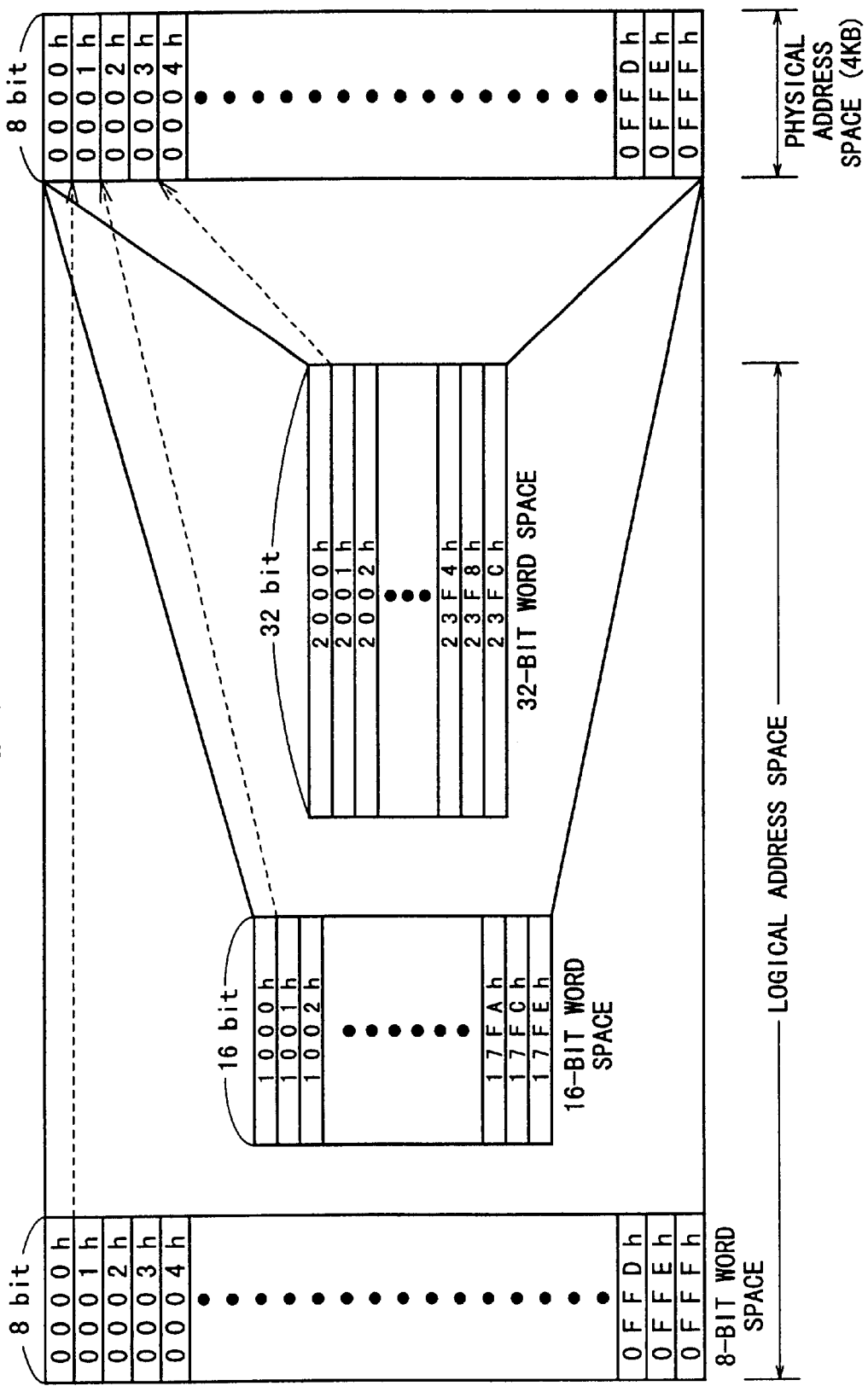
FIG. 3 is a diagram illustrative of a logical address space and a physical address space.

FIG. 3 schematically shows the relationship between a logical address space managed by logical addresses and a physical address space managed by physical addresses. The physical address space is a space created in the main memory 43, and has a predetermined size of 4 KB (kilobytes) in this embodiment. In FIG. 3, numerical Values in each of the spaces represent addresses in respective areas, but not stored data.

The logical address space includes three word spaces including a 8-bit word space, a 16-bit word space, and a 32-bit word space. These word spaces are created depending on the number of bits of data making up each of words handled by the controller 41. If the controller 41 handles words of another number of bits than 8 bits, 16 bits, and 32 bits, then a word space of data made up of the other number of bits is also created in the logical address space. These word spaces store words made up of the corresponding numbers of bits.

Each of the word spaces of the logical address space has a size of 4 KB. Therefore, the logical address space has a total size of 12 KB, which is larger than the physical address space. However, the logical address space and the physical address space are not limited to the above sizes. The size of each of the word spaces of the logical address space may not be the same as the size of the physical address space.

As shown in FIG. 3, the size of each of the word spaces is set to 8 bits, 16 bits, or 32 bits. Each of the word spaces of the logical address space and the physical address space are of a rectangular shape as shown in FIG. 3. The 8-bit physical address space and the 8-bit word space of the logical address space have a horizontal width of 8 bits. The 16-bit word space of the logical address space has a horizontal width of 16 bits. The 32-bit word space of the logical address space has a horizontal width of 32 bits.

Each of the 8-bit word spaces is capable of storing 4096 words as indicated by addresses ranging from 0000h to 0FFFh (h represents a hexadecimal notation). The 16-bit word spaces is capable of storing 2048 words as indicated by addresses ranging from 1000h to 17FFh. The 32-bit word spaces is capable of storing 1024 words as indicated by addresses ranging from 2000h to 23FFh.

One word in each of the 8-bit word spaces corresponds to one word in the physical address space, and one word in the 16-bit word space corresponds to two words in the physical address space. One word in the 32-bit word space corresponds to four words in the physical address space. In order to read words of data from the physical address space at a ratio of 1:1 for the 8-bit word spaces, 1:2 for the 16-bit word space, and 1:4 for the 32-bit word space depending on the number of bits of data of one word in the logical address space, the address converter 42 has a table shown in FIG. 4.

If one word is made up of 8 bits, then logical addresses ranging from 0000h to 0FFFh are used. If one word is made up of 16 bits, then logical addresses ranging from 1000h to 17FFh are used. If one word is made up of 32 bits, then logical addresses ranging from 2000h to 23FFh are used. These logical addresses are represented by numbers that increment successively by 1. Stated otherwise, the address 0000h serves as a base address in the 8-bit word spaces, the address 1000h as a base address in the 16-bit word space, and the address 2000h as a base address in the 32-bit word space. If one word is made up of 8 bits, then physical addresses increment by 1. If one word is made up of 16 bits, then physical addresses increment by 2. If one word is made up of 32 bits, then physical addresses increment by 4.

This is because while one word of 8 bits in the logical address space corresponds to one word in the physical address space because the horizontal width of the physical address space is fixed to 8 bits, a 16-bit word in the logical address space has to correspond to two words in the physical address space, and similarly a 32-bit word in the logical address space has to correspond to four words in the physical address space.

For example, if the controller 41 outputs a logical address "0000h" in the 8-bit word space to the address converter 42, then the address converter 42 associates the entered logical address "0000h" with a physical address "0000h", and outputs the physical address "0000h" to the main memory 43. The main memory 43 outputs data at the physical address "0000h" to the controller 41.

If the controller 41 outputs a logical address "1000h" in the 16-bit word space to the address converter 42, then the address converter 42 associates the entered logical address "1000h" with physical addresses "0000h", "0001h" for two words and outputs the physical addresses "0000h", "0001h" to the main memory 43. If the controller 41 outputs a logical address "1001h" in the 16-bit word space to the address converter 42, then the address converter 42 associates the entered logical address "1001h" with physical addresses "0002h", "0003h". That is, if a logical address increments by 1, then the address converter 42 converts the address such that physical addresses increment by 2, and two-word data at the converted physical addresses are read from the main memory 43.

If the controller 41 outputs a logical address "2000h" in the 32-bit word space to the address converter 42, then the address converter 42 associates the entered logical address "2000h" with physical addresses "0000h"–"0003h" for four words, and outputs the physical addresses "0000h"–"0003h" to the main memory 43. If the controller 41 outputs a logical address "2001h" in the 32-bit word space to the address converter 42, then the address converter 42 associates the entered logical address "2001h" with physical address "0004h"–"0007h". That is, if a logical address increments by 1, then the address converter 42 converts the address such that physical addresses increment by 4, and four-word data at the converted physical addresses are read from the main memory 43.

Figure 5:
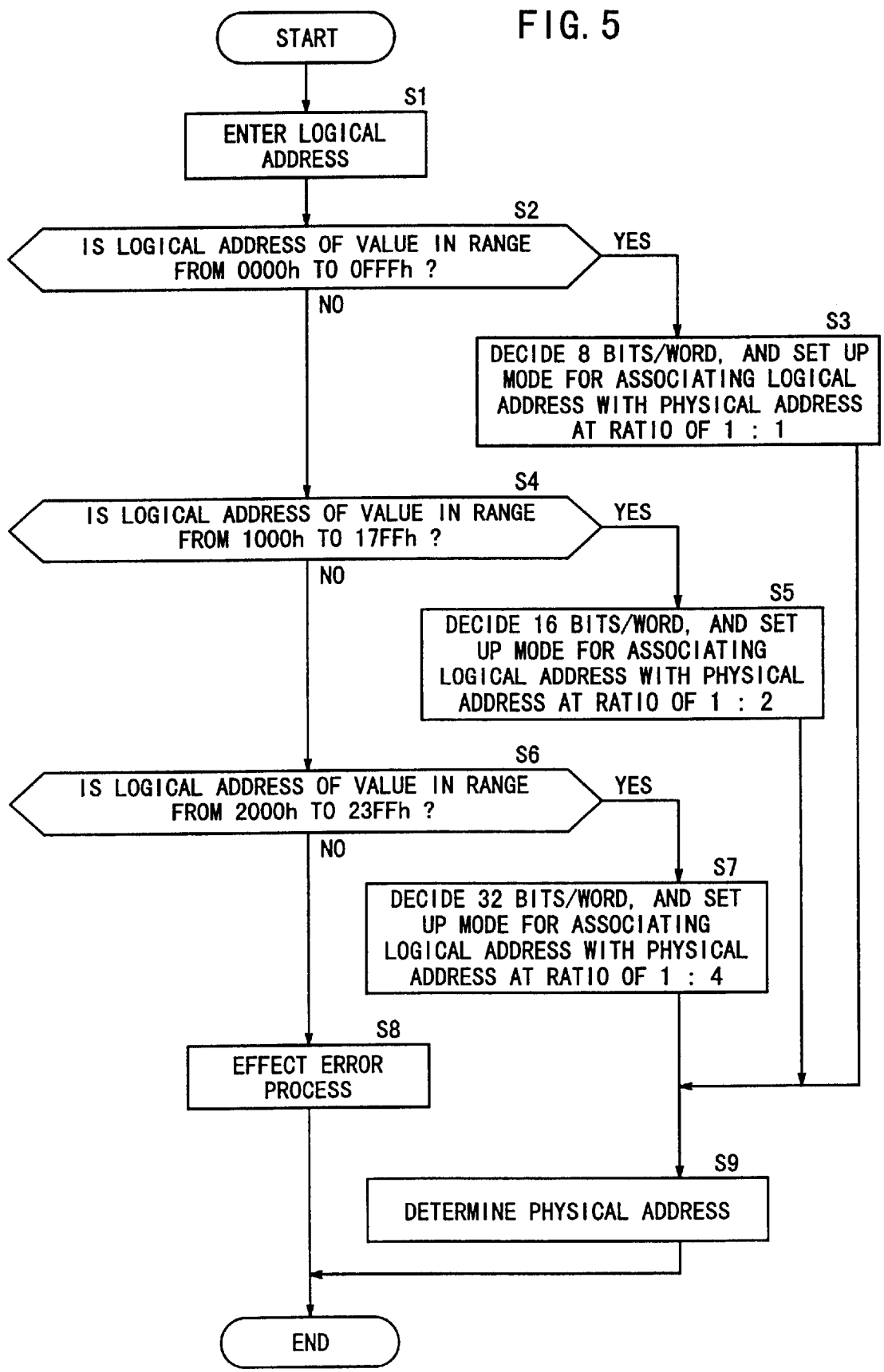
FIG. 5 is a flowchart of an operation sequence of the information processing apparatus shown in FIG. 2.
Figure 6:
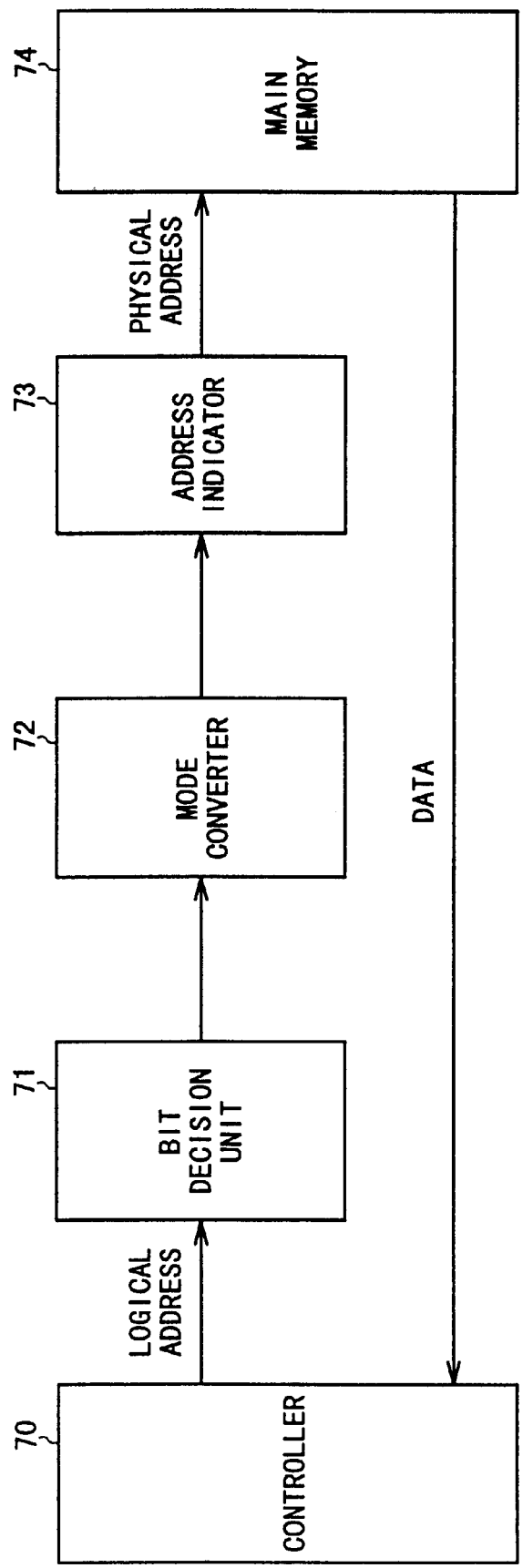
FIG. 6 is a block diagram of a conventional information processing apparatus.

An operation sequence of the address converter 42 will be described below with reference to FIG. 5. In step S1, the address converter 42 is supplied with a logical address outputted by the controller 41. In step S2, the address converter 42 decides whether the entered logical address is of a value in the range from "0000h" to "0FFFh". Stated otherwise, the address converter 42 decides in step S2 whether the base address of the entered logical address is "0000h" or not, i.e., whether the number of bits of data making up one word is "8" or not.

If the address converter 42 determines in step S2 that the entered logical address is of a value in the range from "0000h" to "0FFFh", i.e., if the base address of the entered logical address is "0000h" or the number of bits of data making up one word is "8", then the address converter 42 sets up a mode for associating a logical address with a physical address at a ratio of 1:1 in step S3.

If the address converter 42 determines in step S2 that the entered logical address is not of a value in the range from "0000h" to "0FFFh", then the address converter 42 decides whether the entered logical address is of a value in the range from "1000h" to "17FFh" in step S4. Stated otherwise, the address converter 42 decides whether the base address of the entered logical address is "1000h" or not, i.e., whether the number of bits of data making up one word is "16" or not.

If the address converter 42 determines in step S4 that the entered logical address is of a value in the range from "1000h" to "17FFh", then the address converter 42 sets up a mode for associating a logical address with a physical address at a ratio of 1:2 in step S5.

If the address converter 42 determines in step S4 that the entered logical address is not of a value in the range from "1000h" to "17FFh", then the address converter 42 decides whether the entered logical address is of a value in the range from "2000h" to "23FFh" in step S6. Stated otherwise, the address converter 42 decides whether the base address of the entered logical address is "2000h" or not, i.e., whether the number of bits of data making up one word is "32" or not.

If the address converter 42 determines in step S6 that the entered logical address is of a value in the range from "2000h" to "23FFh", then the address converter 42 sets up a mode for associating a logical address with a physical address at a ratio of 1:4 in step S7.

If the address converter 42 determines in step S6 that the entered logical address is not of a value in the range from "2000h" to "23FFh", then the address converter 42 performs an error process in step S8. That is, the size of one word is not of 8 bits, 16 bits, or 32 bits, and the words cannot be handled by the controller 41.

In each of steps S3, S5, S7, the address converter 42 determines the number of bits of data making up one word, and sets up a mode suitable for the determined number of bits. Thereafter, the address converter 42 refers to the table shown in FIG. 4 and determines a physical address corresponding to the entered logical address in step S9.

As described above, the logical address space includes a plurality of word spaces depending on the number of bits of data making up one word, and the address increments by one in each of those word spaces. In the physical address space, the address increments by different numbers for the respective word spaces. Accordingly, it is possible to use words of different numbers of bits without having to change programs.

A providing medium for providing a computer program and/or data which carries out the above processing to the user may comprise any of various information recording mediums including a magnetic disk, a CD-ROM, etc., and any of various transmission mediums used in networks including the Internet, digital satellite systems, etc.

According to the present invention, because a physical address is determined depending on the base address of a logical address, words of different numbers of bits can be handled without changing programs, and hence a logical address can quickly be converted into a physical address.

Although a certain preferred embodiment of the present invention has been shown and described in detail, it should be understood that various changes and modifications may be made therein without departing from the scope of the appended claims.

What is claimed is:

1. An apparatus for processing information, comprising:
    a logical address space comprising a plurality of logical address ranges, each of said logical address ranges comprising contiguous logical addresses which store therein only words having identical bitlengths, and wherein said logical address ranges respectively store words having different bitlengths;
    input means for entering a logical address;
    decision means for deciding a base address of the logical address entered by said input means and the logical address range in which said logical address resides; and
    determining means for determining a physical address corresponding to the logical address based on the base address and the range in which said logical address resides, as decided by said decision means, said determining means comprising means for determining the number of bits of data making up one word based on the base address of said logical address.

2. An apparatus according to claim 1, wherein the base address of said logical address includes a numerical value based on the number of bits of data making up one word.

3. An apparatus according to claim 1, wherein said determining means further comprises:
    means for determining an updated width for the physical address based on the base address of said logical address; and
    means for determining said physical address based on a deviated value of said logical address and said updated value.

4. An apparatus according to claim 1, wherein said determining means further comprises:
    means for determining the physical address corresponding to said logical address from an association table which contains physical addresses corresponding to the determined number of bits.

5. The apparatus according to claim 4, wherein said association table associates logical addresses with said physical addresses at a predetermined ratio depending on said determined bit structure.

6. The apparatus according to claim 1, wherein said respective logical address ranges comprise a first logical address range storing words having only 8-bit bitlengths, a second logical address range storing words having only 16-bit bitlengths, and a third logical address range storing words having only 32-bit bitlengths.

7. The apparatus according to claim 6, wherein said first logical address range ranges from 0000h to 0FFFh, said second logical address range ranges from 1000h to 17FFh, and said third logical address range ranges from 2000h to 23FFh.

8. A method of processing information, comprising the steps of:
    storing data in a logical address space comprising a plurality of logical address ranges, each of said logical address ranges comprising contiguous logical addresses which store therein only words having identical bitlengths, and wherein said logical address ranges respectively store words having different bitlengths;
    entering a logical address;
    deciding a base address of the entered logical address and the logical address range in which said logical address resides;
    determining a physical address corresponding to the logical address based on the decided base address and the range in which said logical address resides, including determining the number of bits of data making up one word based on the base address of said logical address.

9. A method according to claim 8, wherein the base address of said logical address includes a numerical value based on the number of bits of data making up one word.

10. A method according to claim 8, wherein said step of determining a physical address further comprises the steps of:
    determining an updated width for the physical address based on the base address of said logical address; and
    determining said physical address based on a deviated value of said logical address and said updated value.

11. A method according to claim 8, wherein said step of determining a physical address further comprises the step of:

determining the physical address corresponding to said logical address from an association table which contains physical addresses corresponding to the determined number of bits.

12. The method according to claim 11, wherein said association table associates logical addresses with said physical addresses at a predetermined ratio depending on said determined bit structure.

13. The method according to claim 8, wherein said respective logical address ranges comprise a first logical address range storing words having only 8-bit bitlengths, a second logical address range storing words having only 16-bit bitlengths, and a third logical address range storing words having only 32-bit bitlengths.

14. The method according to claim 13, wherein said first logical address range ranges from 0000h to 0FFFh, said second logical address range ranges from 1000h to 17FFh, and said third logical address range ranges from 2000h to 23FFh.

15. A providing medium for providing a program and/or data readable by a computer to carry out a process including the steps of:

storing data in a logical address space comprising a plurality of logical address ranges, each of said logical address ranges comprising contiguous logical addresses which store therein only words having identical bitlengths, and wherein said logical address ranges respectively store words having different bitlengths;

entering a logical address;

deciding a base address of the entered logical address and the logical address range in which said logical address resides; and determining a physical address corresponding to the logical address based on the decided base address and the range in which said logical address resides, including determining the number of bits of data making up one word based on the base address of said logical address.

16. A providing medium according to claim 15, wherein the base address of said logical address includes a numerical value based on the number of bits of data making up one word.

17. A providing medium according to claim 15, wherein said step of determining a physical address further comprises the steps of:

determining an updated width for the physical address based on the base address of said logical address; and determining said physical address based on a deviated value of said logical address and said updated value.

18. A providing medium according to claim 15, wherein said step of determining a physical address further comprises the step of:

determining the physical address corresponding to said logical address from an association table which contains physical addresses corresponding to the determined number of bits.

19. The providing medium according to claim 18, wherein said association table associates logical addresses with said physical addresses at a predetermined ratio depending on said determined bit structure.

20. The providing medium according to claim 15, wherein said respective logical address ranges comprise a first logical address range storing words having only 8-bit bitlengths, a second logical address range storing words having only 16-bit bitlengths, and a third logical address range storing words having only 32-bit bitlengths.

21. The providing medium according to claim 20, wherein said first logical address range ranges from 0000h to 0FFFh, said second logical address range ranges from 1000h to 17FFh, and said third logical address range ranges from 2000h to 23FFh.

* * * * *